United States Patent
Chan et al.

(10) Patent No.: US 7,363,528 B2
(45) Date of Patent: Apr. 22, 2008

(54) BRINK OF FAILURE AND BREACH OF SECURITY DETECTION AND RECOVERY SYSTEM

(75) Inventors: Chun Kin Chan, Livingston, NJ (US); Uma Chandrashekhar, Morganville, NJ (US); Edwin Olivere Lambert, Brooklyn, NY (US); Andrew R. McGee, Toms River, NJ (US); David D. Picklesimer, West Caldwell, NJ (US); Steven Howard Richman, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 959 days.

(21) Appl. No.: 10/648,628

(22) Filed: Aug. 25, 2003

(65) Prior Publication Data

US 2005/0050377 A1   Mar. 3, 2005

(51) Int. Cl.
*G06F 11/00* (2006.01)
(52) U.S. Cl. .............................. 714/4; 714/43; 714/47; 726/23
(58) Field of Classification Search .................... 714/4, 714/43, 47; 726/23, 24
See application file for complete search history.

(56) References Cited

U.S. PATENT DOCUMENTS

| | | | | |
|---|---|---|---|---|
| 5,261,044 A | * | 11/1993 | Dev et al. .................... 715/855 |
| 5,535,335 A | * | 7/1996 | Cox et al. .................... 709/221 |
| 5,768,501 A | * | 6/1998 | Lewis .......................... 714/48 |
| 5,872,911 A | * | 2/1999 | Berg ............................ 714/43 |
| 5,872,912 A | * | 2/1999 | Brownmiller et al. ........ 714/47 |
| 6,397,247 B1 | * | 5/2002 | Shirakawa et al. ......... 709/223 |
| 6,453,345 B2 | * | 9/2002 | Trcka et al. ................ 709/224 |
| 6,948,102 B2 | * | 9/2005 | Smith .......................... 714/47 |
| 7,024,580 B2 | * | 4/2006 | Guimbellot et al. ........... 714/1 |
| 7,058,861 B1 | * | 6/2006 | Adams ........................ 714/47 |
| 7,225,250 B1 | * | 5/2007 | Harrop ....................... 709/224 |
| 2004/0219909 A1 | * | 11/2004 | Kennedy et al. ......... 455/422.1 |
| 2004/0221190 A1 | * | 11/2004 | Roletto et al. ................. 714/4 |

\* cited by examiner

*Primary Examiner*—Gabriel Chu
*Assistant Examiner*—Joseph Schell

(57) ABSTRACT

A method and apparatus for managing a network includes detecting occurrence of a network event associated with a new network condition including unplanned and planned macro-events associated with network elements and communication links of the network. The network event is classified as being associated with at least one of a network element failure, communications link failure, and a security breach. In response to the network event exceeding a network degradation threshold, the network event is identified as a network degradation event, and an alert is sent to a network administrator to normalize the network degradation event.

34 Claims, 10 Drawing Sheets

Normal Traffic Between Seattle And Chicago
FIG. 4A
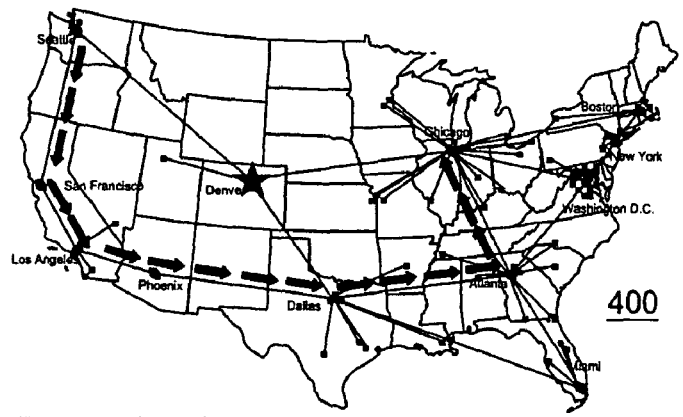
Rerouted Traffic Between Seattle And Chicago
FIG. 4B
BOS_S1: Switch Offline
BOS_P1: Close Logical Connections
　　　　　Disable Physical Ports
500
NOC Screen Showing Breach Of Security Condition.
FIG. 5A

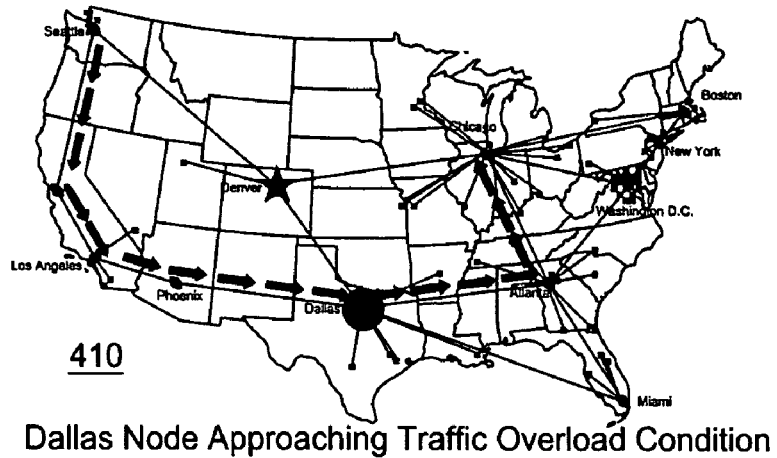

410

Dallas Node Approaching Traffic Overload Condition

FIG. 4C

```
BOS_S1:  Switch Offline
BOS_P1:  Close Logical Connections
         Disable Physical Ports BOF_S5:  Switch Entering Overload
BOF_P1:  Apply Traffic Control
```

NOC Screen Showing Brink of Failure Condition

FIG. 5B

```
BOS_S1:  Switch Offline
BOS_P1:  Close Logical Connections
         Disable Physical Ports BOF_S5:  Switch Entering Overload
BOF_P1:  Apply Traffic Control BOF_S5:  Scheduled Power Outage
BOF_P2:  Check Power Backup
         Re-schedule Maintenance
```

NOC Screen Showing Second Brink of Failure Condition

FIG. 5C

Packet Classification Buffers in Dallas Node Exceed Threshold

BOS_S5: Switch Entering Overload
BOF_P1: Apply Trafic Control

BOF_S5: Scheduled Power Outage
BOF_P2: Check Power Backup
　　　　　Re-schedule Maintenance BOS_S5: Security Buffer Exceeds
　　　　　Threshold
BOS_P2: Increase Size of Security Buffer
　　　　　Reduce Input Port Speeds NOC Screen Displays New Breach of Security

BRINK OF FAILURE AND BREACH OF SECURITY DETECTION AND RECOVERY SYSTEM

FIELD OF INVENTION

The present invention relates to network management. More specifically, the invention relates to the detection and recovery from impending failures and security breaches in a network.

BACKGROUND OF INVENTION

Network outages cost Service Providers money in several ways, the most obvious being the direct loss of revenue from customers being unable to access the network during the outage, as well as the personal impact to end-users not being able to establish a connection during emergency situations. In addition, with today's trend of offering Service Level Agreements (SLAs) to their customers, Service Providers incur significant additional penalties in the form of free service or punitive damages should their networks become unavailable. Regulators in many countries (e.g., the United States) currently require a detailed report if voice networks experience prolonged outages. This type of requirement may be imposed on data networks and represents a significant concern because of the historically low reliability of data networks as compared to voice networks. It is therefore incumbent upon Service Providers to proactively monitor their networks and address potential outages before they happen.

Unfortunately, with today's technology, this proactive network monitoring is very labor intensive and can never be 100% effective in preventing network outages. For example, a series of seemingly unrelated and minor events over an extended period of time, or in seemingly uncorrelated locations in the network, can escalate to catastrophic network failure and dynamically change the network's security posture. These interactions are often too subtle and occur over an extended time period that is too long for people to recognize the correlation and impending situation. Moreover, planned and unplanned network events (e.g., network maintenance activities vs. network alarms) can also be the cause of major outages and are often documented on separate systems, further exacerbating the problem.

Additionally, the reporting of network reliability and network security information is currently done on separate systems despite the strong correlation between the two. For instance, a cyber-attack on network elements has a direct impact on the network's availability. Likewise, a reduction in the network's reliability can trigger new security vulnerabilities by introducing unanticipated traffic patterns into the network. For example, a failed load balancer with security features would leave a server farm located behind it wide open to attack.

SUMMARY OF THE INVENTION

Accordingly, we have recognized that there is a need for an integrated system that continuously and proactively monitors, and correlates a network for events and trends that cause changes in the network's overall reliability and security posture. To this end, we have developed a novel method and apparatus for detecting occurrence of a network event associated with a new network condition including unplanned and planned macro-events associated with network elements and communication links of the network. The network event is classified as being associated with at least one of a network element failure, communications link failure, and a security breach. In response to one or more network events exceeding a network degradation threshold, the network events are identified as a network degradation event, and an alert is sent to a network administrator to normalize the network degradation event.

More specifically, the method and apparatus determines whether a network comprising network elements (e.g., switches, bridges, routers, among others) and communications links (e.g., wired and wireless communications links) has entered what we call a "brink-of-failure" (BOF) condition and/or a "breach of security" (BOS) condition, and if so, reporting such BOF/BOS conditions and associated corrective actions, illustratively, to a network administrator for resolution. A network may be considered in a BOF state when it is anticipated that a failure will occur in one or more network elements and/or links within a predetermined time interval (e.g., minutes or hours). A failure in this context is a major (macro) event or a sequence of events that affects a large number of end users (e.g. many calls blocked), and/or takes out a critical functionality (e.g., E911 service). Similarly, a BOS condition is deemed to exist if a network event is considered to exploit a security vulnerability resulting in at least one of an unauthorized access, an unauthorized modification or compromise, a denial of access to information, a denial of access to network monitoring capability, and a denial of access to network control capability.

By identifying and reporting network brink-of-failure and breach of security conditions, the BOF/BOS System of the present invention presents a window of opportunity for a service provider to avoid an outage or mitigate the impact of an outage. That is, the network operator is provided time to take a proactive role in avoiding the network outage and to perform preventive actions to avoid imminent network outages and their associated loss of revenue.

In one embodiment, a BOF/BOS System automatically and continuously monitors input from various security and network management systems installed in the network. The BOF/BOS system includes a plurality of databases that store historic and real-time information regarding scheduled events, existing network conditions, network topology, brink-of-failure corrective action procedures, and security vulnerabilities and corrective action procedures. Detected network events (e.g., maintenance schedules, trouble tickets, operations alarms, security alarms, and the like) are correlated from the databases to detect BOF/BOS conditions to determine whether the network event is considered as a brink-of-failure event or breach of security event. A BOF and/or BOS event is categorized such that appropriate remedial action may be determined and reported to network operations personnel. Accordingly, the BOF/BOS System can prioritize events that could lead to an outage, and provide the projected time window of when the network outage will occur. In addition, the system can provide insights that can help to better coordinate planned network activities.

BRIEF DESCRIPTION OF THE DRAWINGS

The teachings of the present invention can be readily understood by considering the following detailed description in conjunction with the accompanying drawings, in which:

FIGS. 4A-4D depict an exemplary network utilizing the BOF/BOS DRS of the present invention; and FIGS. 5A-5D depict exemplary display screens of the BOF/BOS DRS respectively associated with the exemplary network of FIGS. 4A-4D.

Figure 1:
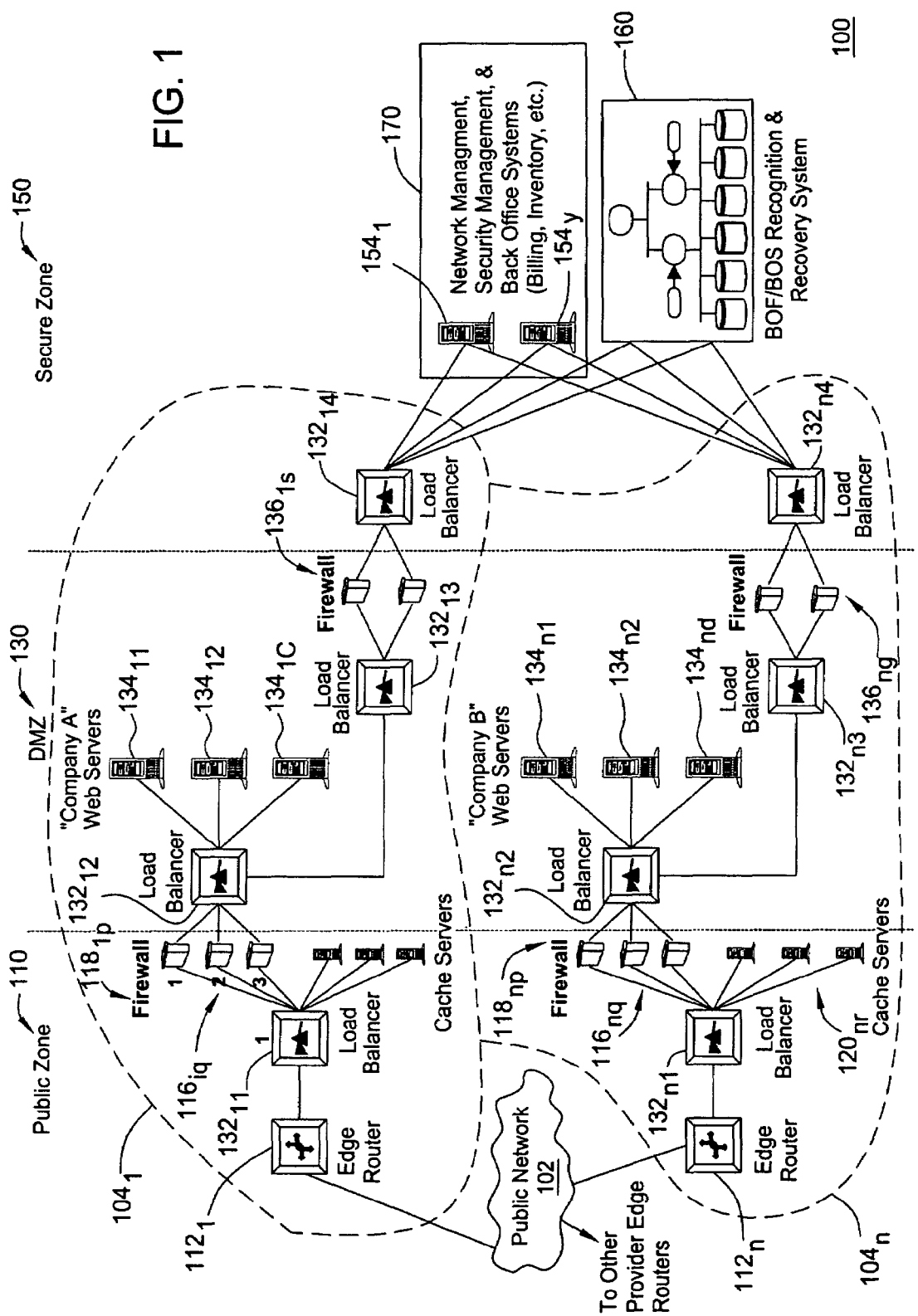
FIG. 1 depicts a block diagram of a network environment suitable for supporting a Brink of Failure and Breach of Security Detection and Recovery System (BOF/BOS DRS) of the present invention.

To facilitate understanding of the invention, identical reference numerals have been used, where possible, to designate identical elements that are common to the figures. Further, unless specified otherwise, any alphabetic letter subscript associated with a reference number represents an integer greater than one.

DETAILED DESCRIPTION OF THE INVENTION

A network may be considered in a "Brink of Failure" (BOF) state when a failure will occur within a short time window (minutes or hours). A failure in this context is a major event or a sequence of events that affects a large number of end users (e.g. many calls blocked), and/or takes out a critical functionality (e.g., E911 service). The BOF time window presents a window of opportunity for the Service Provider to avoid a network outage altogether or mitigate the impact of the network outage (e.g. reducing the outage time) by taking appropriate proactive actions.

The present invention provides an automated "Brink of Failure" (BOF) and Breach of Security (BOS) Detection and Recovery System that correlates network events to recognize and diagnose brink of failure conditions, provide an integrated assessment of their impact on the network's security posture if one exists, and suggest remedial actions to prevent or mitigate imminent network outages or security vulnerabilities. The system also recognizes changes in the network's security posture that are unrelated to BOF conditions. All information is provided on a unified display that can be integrated into a Service Provider's Network Operations Center (NOC). Examples are also provided to demonstrate how this system can be used to proactively predict and prevent network outages.

FIG. 1 depicts a block diagram of a network environment 100 suitable for supporting a Brink of Failure and Breach of Security Detection and Recovery System (BOF/BOS DRS) 160 of the present invention. The network 100 is illustratively shown as an Internet Service Provider (ISP) network for hosting Internet web services for one or more clients (customers). However, one skilled in the art will appreciate the network 100 may be any type of network environment 100 (e.g., ATM, SONET, among other data and multimedia networks). FIG. 1 depicts two exemplary customers (Customer A $104_1$, and Customer B $104_n$, where n is an integer greater than one), however one skilled in the art will appreciate that an ISP may support numerous customers. For purposes of simplifying understanding of the invention, the network is illustratively discussed in terms of the first Company A $104_1$, although the teachings herein are also applicable to other customer sites.

The exemplary network 100 of the ISP illustratively comprises a network management, security management, and back office system (NMBOS) 170, the BOF/BOS DRS 160 of the present invention, as well as other network elements to support each customer $104_n$ of the ISP. The network elements supporting each customer 104 illustratively include a provider edge (PE) router 112, one or more web servers 134, one or more firewalls (e.g., firewalls 118 and 136), and one or more load balancers 132.

As shown in FIG. 1 from left to right, for exemplary customer "A" $104_1$, PE router $112_1$ is coupled to the Internet 102 and provides communications thereto in a conventional manner known in the art. The PE router $112_1$, is coupled to a first load balancer $132_{11}$, which is further coupled to a first plurality of firewalls $118_{11}$ through $118_{1p}$ and a plurality of cache servers $120_1$ through $120_r$ (where p and r are integers greater than zero). It is noted that the number of load balancers 132, cache servers 120, and first plurality firewalls 118 are dependent on the needs and minimal requirements of the customer 104, which are typically defined in a customer service level agreement (SLA) with the service provider.

The first plurality of firewalls 118 is illustratively coupled to a plurality of web servers $134_{11}$, through $134_{1c}$ (where c is an integer greater than zero), which are dedicated for use by Company A $104_1$, to facilitate company A's websites, email, and other Internet or data services. The dedicated web servers $134_1$, of Company A $104_1$ are illustratively coupled to the firewalls $118_{1p}$ via a second load balancer $132_{12}$. It is noted that the first plurality of firewalls 118 provide security for the web servers 134 in a portion of the network 100 commonly termed a "demilitarized zone" (DMZ) 130, which has a security level greater than a public zone 110 of the network 100 (e.g., including the Internet 102). It is also noted that the load balancers 132 are optionally provided in those instances where alternative traffic paths are desirable to relieve data flow congestion.

The second load balancer $132_{12}$ is also coupled to a third load balancer $132_{13}$, which is further coupled to a second plurality of firewalls $136_{1s}$, (where s is an integer greater than zero). The second plurality of firewalls 136 is coupled to a fourth load balancer $132_{14}$, which is coupled to the centralized network management, security management, and back office system (NMBOS) 170 and the BOF/BOS DRS 160 of the present invention 160. The NMBOS 170 illustratively comprises one or more support servers $154_1$, through $154_y$, (collectively support servers 154, and where y is an integer greater than zero) for providing administrative, billing, inventory, and other functions of the service provider to support of one or more of its clients 104. The second plurality of firewalls 136 establishes a secure zone 150 portion of the network 100 for the NMBOS 170 and the BOF/BOS DRS 160, such that there is virtually no public access from the Internet 102 to the NMBOS 170 and the BOF/BOS DRS 160.

Although FIG. 1 depicts a plurality of network elements (e.g., firewalls 118 and 136, cache servers 120, load balancers 132, web servers 134, support servers 154, and other network elements, one skilled in the art will appreciate that single network elements may also be suitable for use in a particular network topology. It is also noted that the second customer B $104_n$ is illustratively shown with the same configuration as the first customer A $104_1$. However, those skilled in the art will appreciate that various different layouts (e.g., partial or full mesh networks, hub-and-spoke, star networks) may be implemented to form the ISP's network topology. Thus, the data center architecture shown in FIG. 1 is used for exemplary purposes only, and the Brink of Failure/Breach of Security System 160 of the present invention may be implemented in any type of network architecture.

Figure 2:
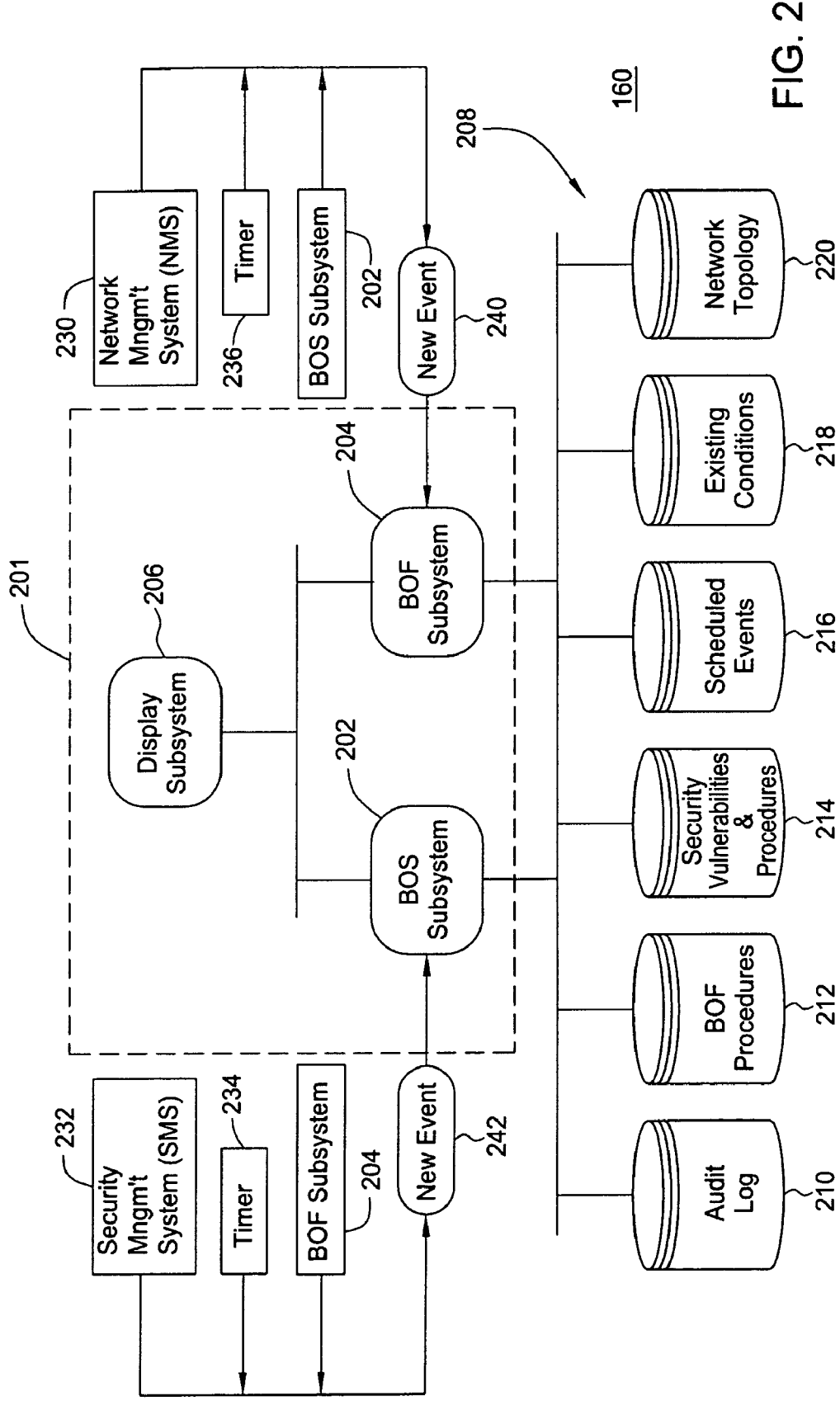
FIG. 2 depicts a detailed block diagram of the BOF/BOS DRS of the present invention.

FIG. 2 depicts a detailed block diagram of the BOF/BOS DRS 160 of the present invention. The Brink of Failure/Breach of Security (BOF/BOS) System 160 uses historic and real-time data to determine and display, through BOF/BOS engines, proactive action required to minimize impact. The functional architecture of the BOF/BOS System comprises three subsystems 201 and a plurality of data stores 208, which are used by the subsystems 201. In particular, the three subsystems 201 comprise a Breach of Security (BOS) Subsystem 202, a Brink of Failure (BOF) Subsystem 204, and a Display Subsystem 206. The BOS subsystem 202 and BOF subsystem 204 are coupled to a plurality of databases 208. The BOS/BOF subsystems 202 and 204 have correlation algorithms in place to address detection, correction, and prevention of outages based on historic and on-going real-time events taking place in the monitored network 100.

The plurality of data stores 208 comprises an Audit Log 210, a BOF Procedures database 212, a Security Vulnerabilities and Procedures (SVP) database 214, a Scheduled Events database 216, an Existing Conditions database 218, and a Network Topology database 220. The Audit Log 210 tracks the historical events and changes to the network 100, as discussed in further detail below. The BOF procedures database 212 includes corrective action that is displayed on the display system 206 to help resolve an event. The SVP database 214 includes information regarding security issues and procedures to help resolve security issues. The scheduled events database 216 comprises scheduled tasks or maintenance events to be performed on elements of the network 100. The existing conditions database 218 comprises macro events that have not been resolved. The network topology database 220 comprises information about the various elements (e.g., switches, routers, firewalls, load balancers, and the like) and connectivity between the elements (e.g., tunnels, virtual circuits, links, and the like) in the network 100.

The Display Subsystem 206 provides a unified interface for the reporting of BOF and BOS conditions that can be integrated into a Service Provider's network operations center (NOC). A unified and correlated interface is important due to the interrelationships between BOF and BOS subsystems 204 and 202, as described below in further detail. The output of the Display Subsystem 206 can be displayed on an integrated network management screen or on a stand-alone terminal dedicated to monitoring BOF/BOS conditions. All information output by the Display Subsystem 206 is recorded in the Audit Log 210 for future reference.

The BOF/BOS System 160 may be installed on a server, workstation, or any other conventional computing device having one or more processors, memory, and support circuitry to execute the BOF/BOS System 160 of the present invention. Specifically, the processor cooperates with conventional support circuitry, such as power supplies, clock circuits, cache memory, and the like, as well as circuits that assist in executing the software routines stored in the memory. The BOF/BOS System 160 also contains input/output (I/O) circuitry (not shown) that forms an interface between the various physical and functional elements communicating with the BOF/BOS System 160. As such, it is contemplated that some of the process steps discussed herein as software processes may be implemented within hardware, for example as circuitry that cooperates with the processor to perform various steps.

Although the BOF/BOS System 160 of FIG. 2 is described as a general-purpose computer that is programmed to perform various control functions in accordance with the present invention, the invention can be implemented in hardware as, for example, an application specific integrated circuit (ASIC). As such, it is intended that the processes described herein be broadly interpreted as being equivalently performed by software, hardware, or a combination thereof.

The BOF and BOS Subsystems 204 and 202 are responsible for correlating network events in order to detect BOF/BOS conditions. The Brink of Failure/Breach of Security System 160 monitors the edge routers 112, load balancers 132, and firewalls 118 and 136 forming the data center network infrastructure for Brink of Failure and Breach of Security conditions. The BOF Subsystem 204 receives a new event 240 generated by a Network Management System 230, BOS Subsystem 202 or System Timer 234. The Network Management System 230 identifies and routes system alarms, error messages, and connectivity problems to the BOF Subsystem 202, which correlates these and existing events to determine if a Brink of Failure (BOF) condition exists. The BOS Subsystem 202 also generates a new event 240 to signal the BOF Subsystem 204 that a breach of security event has occurred or been cleared so that the effect of the security event on network availability can be assessed. The System Timer 234 is used to periodically activate the BOF subsystem 204 in the absence of other events.

The BOS Subsystem 202 receives a new event 242 generated by the Security Management System 232, BOF Subsystem 204, or System Timer 236. The Security Management System 232 forwards alarms that it receives from the security appliances (e.g., firewalls, intrusion detection systems, etc.) deployed in the network, to the BOS Subsystem 202 by means of a new event 242. The BOF Subsystem 204 also generates a new event 242 to signal the BOS subsystem 202 that a brink of failure condition has occurred or been cleared so that its effect on the network security posture can be assessed. The System Timer 236 is used to periodically activate the BOS Subsystem 202 in the absence of other events.

The BOF/BOS Detection and Recovery System 160 addresses macro-events that affect entire network elements or physical facilities, such as ports, switches, transmission facilities, and offices going offline. This approach is taken because even the most advanced event correlation systems available today are plagued by false positive alarms, which reduce their effectiveness in addressing potential network outages and security breaches. The overwhelming amount of data provided by current event-logging systems contributes to false positives and the correlation of event log entries into actionable items is the subject of on-going research. As discussed below, unrecognized combinations of macro events have resulted in preventable network outages and potential security breaches. By acting on these types of macro events, the BOF/BOS DRS 160 of the present invention helps prevent a class of network outages and security breaches, and potentially reduces network operations costs.

When discussing network outages, one typically thinks of the effect on end-user traffic. However, control (or signaling) traffic as well as network management traffic can also be affected by BOF and BOS conditions. Therefore, the BOF concept and obvious security concerns, as well as the BOF/BOS System 160 of the present invention also apply to these types of traffic, whether the traffic is carried in-band with end-user traffic or in separate out-of-band networks. For the sake of simplicity, BOF and BOS is discussed as it relates to end-user traffic, however one skilled in the art will appreciate that BOF and BOS may also be applied to the controvsignaling and management networks and/or traffic as well.

Reliability and availability are separate but related concepts that are defined herein for better understanding of the invention. In particular, reliability is the probability that a system or component will operate without failure for a specified period of time in a specified environment. However, the term reliability (as a discipline) is also used in a broader (more general) context to encompass metrics such as availability, maintainability, among others.

Network availability is defined as the fraction of time during which a network, network segment, network service, or network-based application is operational and accessible to users. It is noted that a network can fail often (low reliability) but still be highly available by virtue of very fast restoration times. On the other hand, a network that operates without failure for a long period of time may have low availability because the restoration time is very long. The long restoration time could be due to the lack of spares, improper design for recovery, or the failed network element is in a very remote area.

While different Service Providers have their own definitions of the severity of a failure, there is a common benchmark defined by the Federal Communications Commission (FCC), where a Service Provider is required to file a network outage report if a wire-line voice network failure (outage) affects 30,000 or more lines and lasts 30 or more minutes. Whereas the FCC reportable event focuses on the duration of the outage, the BOF approach focuses on the time window prior to the outage. Thus, the BOF time window represents an opportunity for the Service Provider to take preventive, corrective action in order to avoid a network outage or mitigate its impact so that the event is non-service affecting and need not be reported to the FCC.

It should be noted that the current FCC outage reports mainly cover voice wire-line network outages. Occasionally one encounters data network outage reports, which were filed by mistake and then later withdrawn because the FCC currently does not require data network outages to be filed. However, in the future, the FCC will require filing of data network outages, pending changes in the reported metrics (for example, currently Service Providers report the number of blocked calls, which is not always appropriate for data networks).

Events that affect a network in terms of reliability and availability include unplanned events, such as failures due to hardware/software faults. To improve the reliability and availability of the network, many network designs include redundant features and/or elements, which serve as backup in case a primary element fails. For example, a conventional SONET ring spends most of the time in a "duplex" state, where the ring is up and operating to route bi-directional data traffic through a pair of rings. Accordingly, the SONET ring is designed to be fault-tolerant. Any failure in the SONET ring would bring the system to a "simplex" exposure state, where the term "simplex" means the ring operates without redundancy and the term "exposure" suggests that the ring is now vulnerable.

Upon detection of the failure, the restoration back to a duplex state is typically deferred to a safe maintenance window, when the traffic demand is low. While the failed ring is awaiting repair, a second failure in the surviving ring will cause an outage. The transition from a degraded simplex state of operation to an outage is typically on a long time scale compared to the repair time. Therefore, restoration may be deferred from the simplex state of operation back to the duplex state of operation with minimal chance of an outage occurring. It should be noted that the network is not in a BOF state because the time to restore is much shorter than the mean time to the next failure, and accordingly a network outage is not imminent.

Various studies (e.g., "Generic Reliability Assurance Requirements for Fiber Optic Transport Systems," GR-418-CORE, Telecordia Technologies, December 1999) have shown that while the system is in the simplex state, the mean time to the next failure (most likely a cable cut) is 25,000 hours, which is much longer than the time to repair (typically less than 24 hours). Therefore, the exemplary failure of one of the SONET rings does not give rise to a brink of failure event.

However, many network outages are also due to planned events (e.g. software upgrade, maintenance activities, etc.). Very often it is a planned event that pushes the network in a Brink of Failure state. For example, while the SONET ring is in a simplex state, an event is planned on the surviving path without realizing that the ring is in a simplex exposure state. The planned event now pushes the ring into a Brink of Failure state, which could be minutes or hours away from the outage state. If there were a warning system to correlate the simplex state and the planned event, the outage could be avoided. Because of the short BOF time window (hours or minutes), action must be taken, e.g. restoring the system to a duplex state. In other words, the transition from a brink of failure state to a duplex cannot be deferred. It should be noted that one could bring the network from a brink of failure state to a simplex state by rescheduling the planned event to a later time because, even though it is desirable to restore the network to a duplex state immediately, a spare unit may not be available to complete the repair.

It should be noted that sometimes a network might transition from a duplex state into a compromised state, which is a state with a latent fault. For instance, a power contractor did not ground the equipment properly after working on the power plant in a central office. An approaching storm would then put the central office in the BOF state because a network outage will occur when the storm reaches the central office. If one can correlate the power work event with the approaching storm, then the grounding error could be rectified within the BOF time window.

It is also noted that a network can also enter a BOF state directly from congestion, such as a mass call-in event (e.g., calling to get World Series tickets). Once the traffic is built up, the automatic or previously planned overload control might not be sufficient to prevent the network entering an outage state. Then manual intervention might be necessary. Again it is desirable to have a system to flag the BOF state and also provide the proper procedures in the BOF time window.

Network administrators must be ever vigilant in order to keep their network's security posture up-to-date. The combination of automated attack scripts available for download from hacker web sites, coupled with increased interest in launching attacks requires network administrators to be aware of all security vulnerabilities as well as constantly keeping up with the latest vulnerability patches and configuration recommendations. Still, audits continue to show that basic network security principles are not routinely followed. In fact, the Computer Emergency Response Team (CERT) reported a four-fold increase in the number of security breaches over the last two years to 82,094 in 2002.

A Breach of Security (BOS), as defined herein, is considered to be an exploit of a vulnerability resulting in unauthorized access to, unauthorized modification or compromise of, or denial of access to information, network monitoring capability or network control capability. Network operators must employ a number of techniques and tools to keep their data, intellectual property, personnel information, and Operations Support Systems (OSSs) secure from internal and external threats. The security policy is critical, as it actually defines appropriate uses of the network, data, and services. It also specifies security levels for various parts of the network, methods and procedures for keeping information secure, and procedures to follow when a BOS occurs.

Using the security policy, network routers and firewalls may be properly configured to allow only the required services to be offered to the users, shutting down unused address ranges and ports. Hackers often scan for open ports where they can penetrate and exploit the network. By limiting the services, addresses, and ports to only the ones needed, network operators can focus on securing only the capabilities they support, thereby limiting their exposure to potential vulnerabilities.

Network operators also employ intrusion detection tools that look for attack signatures and provide a warning when the network is under attack. The operator is able to thwart the attack by refusing access to the hacker. A problem with these systems is that they provide many false alarms, resulting in significant time being wasted in determining whether an actual attack is occurring. Often, overworked information technology personnel ignore most of the intrusion detection warnings.

Another popular way for hackers to gain access to networks is through buffer overflows. Some of the most widely used compilers require that memory be reserved for variables, buffers, stacks, and the like. If code is not carefully designed and tested, sometimes hackers can input program instructions, in the form of data, at input prompts, which causes executable code to be placed into the input buffer. When the input buffer overflows, often normal instruction space is overwritten causing the bogus instructions to execute or the system to restart. Applications that are poorly or hastily written, or poorly tested are most prone to these buffer overflows. Recently though, many SNMP implementations, which have been in use for years, were found to have numerous coding errors that could be exploited to cause buffer overflows. Hackers like to cause buffer overflows because they can cause a system crash that potentially gives them "Super User" or administrative access to the system. Because of the trust relationships between various systems in the network, hackers can gain control of a large part of the network through this technique. Network operators can reduce the likelihood of buffer overflows by ensuring that good design procedures are used, with thorough code reviews and software testing being performed before installing any software on the network.

There are numerous other tools and techniques at the network operator's disposal that can help to ensure a secure operating environment. Operators must constantly weigh tradeoffs between resources, costs, and risk in order to optimize the security of their network. Outside security audits or assessments should be performed regularly to provide confirmation that the risk of attack is acceptable to the Service Provider or their customers. Even when the network operator is employing all the techniques at their disposal, there is still a risk of attack, particularly during a failure situation.

Failures create discontinuities in normal network operations procedures. During these discontinuities, operations personal are normally preoccupied with correcting the problem, and paying less attention to security. As a result, the security posture of the network can change without the operator's knowledge. Sometimes equipment is configured to "self-heal" and this may cause security holes. If network equipment simply reboots and comes up in default mode with all ports open and requiring no passwords for administrative access to the equipment (buffer overflows sometimes cause this to occur) security holes may be present for hours, until an operator is notified of the failure. Other times, replacement equipment is brought online quickly that has not been configured with proper security settings or software versions, again opening security holes for hours or days.

The security risks resulting from failures are a reason why the Brink of Failure (BOF) state can be useful to network operators. If the BOF state can be identified, whether it results from extraordinary network occurrences or from a BOS, security policies can be developed that can increase the security level (e.g., shutting down all but essential services and address ranges) while in this state. This reduces the likelihood of a BOS causing a failure, but if a failure does occur, it will be even more difficult for hackers to exploit vulnerabilities that may arise.

Figure 3A:
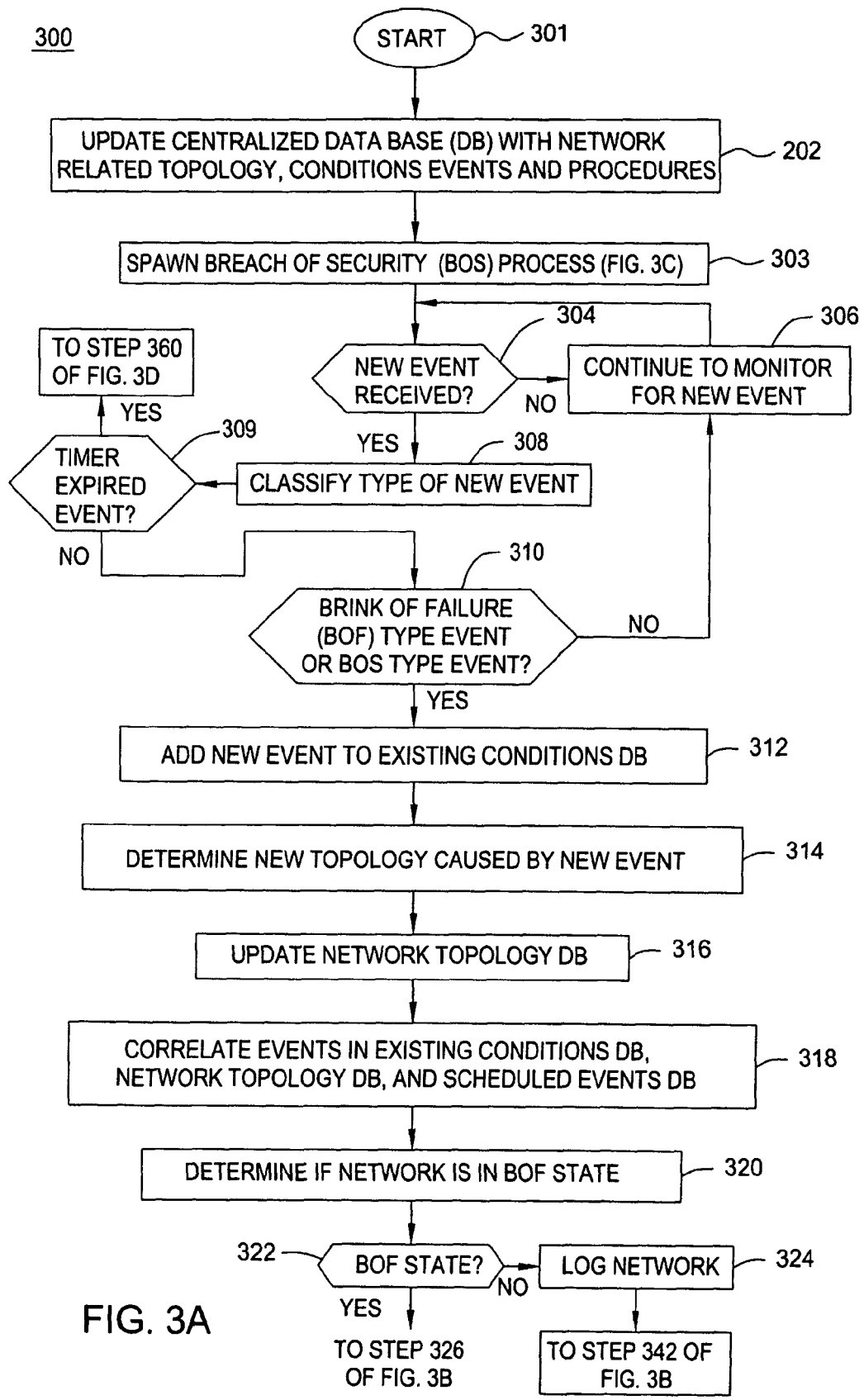
FIGS. 3A-3E collectively depict a flow diagram of a method of implementing the BOF/BOS DRS of the present invention.

FIGS. 3A-3E collectively depict a flow diagram of a method 300 of implementing the BOF/BOS DRS 160 of the present invention. For a better understanding of the invention, FIGS. 3A-3E should be viewed along with FIGS. 1 and 2. Referring to FIG. 3A, the method 300 starts at step 301 and proceeds to step 302 where the databases 208 of the BOF/BOS DRS 160 are continually updated with the latest network information regarding maintenance events and schedules, changes to the network topology, security issues, corrective action procedures, new events (i.e., macro-events) that may affect the operation of the network 100, and the like. The method 300 then proceeds to step 303. At step 303, the BOS Subsystem processing is spawned. Specifically, the BOS Subsystem 202 operates contemporaneously with the BOF Subsystem processing. The BOS Subsystem processing is described below in further detail with respect to FIG. 3C.

The BOF/BOS DRS 160 continually monitors for macro-events that are received from various network management systems 230, security management systems 232, and/or system timers 234 and 236. The Brink of Failure (BOF) Subsystem 204 is responsible for determining if a new network event caused the network to enter or leave a BOF condition. For example, a network management system 230 notifies the BOF Subsystem 204 of a new network event, such as a switch going off-line, coming back on-line, among others. Similarly, the BOS Subsystem 202 notifies the BOF Subsystem 204 of a security event, such as a denial of service attack, among other security related events. A system timer 234 is used to activate the BOF Subsystem 204 if no other events have occurred during a specified time period. If at step 304, the BOF/BOS DRS 160 does not receive a new event, the method 300 proceeds to step 306, and continues to monitor until a new event is received.

Once a new event is received, at step 308 the new event is classified as either a potential brink of failure (BOF) type event 240, a potential breach of security (BOS) type event 242, or a system timer expiration type event. If at step 309, the event is a system timer expiration type event, the method 300 proceeds to step 360, which is discussed below in further detail with respect to FIG. 3D. If at step 310 the event is not a potential BOF type event 240 or BOS type event 242, the method 300 proceeds to step 306, and continues to monitor for new events.

If at step 310, the new event is classified as a potential BOF type event 240 or BOS type event 242, then at step 312, the BOF Subsystem 204 stores the network event in the Existing Conditions Database 218. At step 314, the BOF subsystem 204 determines the new topology caused by the new event. For example, if there is a loss of a communications link between two switches, the BOF subsystem 204 makes the appropriate modifications to the network topology (e.g., disable that communications link). At step 316, the Network Topology Database 220 is updated to reflect modifications to the network topology resulting from the event. For example, the BOF Subsystem will update the network topology to disable that communications link. The method 300 then proceeds to step 318.

At step 318, the BOF Subsystem 204 performs a correlation between events contained in the Existing Conditions Database 218, the network topology (contained in the Network Topology Database 220), and the Scheduled Events Database 216 to determine if the network has entered a BOF condition. The Scheduled Events Database 216 contains all scheduled activities to be performed on the network that could affect the network's reliability or availability. Examples of information stored in the Scheduled Events Database 216 include scheduled hardware and software upgrades, system outages, and the like, as well as the addition or removal of network elements and the reconfiguration of the network topology. The information in the scheduled events database 216 is populated by various conventional operations systems that are not shown in the drawings.

At step 320, the BOF subsystem 204 determines if the new event is an actual BOF condition. Recall that a BOF condition arises when a failure will occur within a short time window (e.g., minutes or hours), and a failure in this context is a major event or a sequence of events that affects a large number of end users, and/or takes out a critical functionality. The method 300 then proceeds to step 322. It is noted that the conventional reliability and network availability disciplines, which illustratively include failure rates, mean-time-between-failures (MTBF), mean-time-to-repair (MTTR), and spare parts availability metrics of various network elements, may be utilized to determine if a BOF condition exists.

If at step 322, the network has not entered a BOF condition, the method 300 proceeds to step 324, where the non-BOF condition event is logged in the Audit Log 210 for future reference. Method 300 then proceeds to step 342, as discussed in further detail below with respect to FIG. 3B.

If at step 322, the BOF Subsystem determines that the network has entered a BOF condition, the method 300 proceeds to step 326 (FIG. 3B), where the BOF subsystem 204 categorizes the condition, such as entering or leaving a BOF state, leaving a BOS state, among others. The BOF subsystem 204 further categorizes the condition in order to assist in the look up of corrective procedures from the BOF Procedures Database 212, as well as determine if the BOS subsystem 202 needs to be notified. Example types of BOF conditions include: (1) scheduled or rescheduled power outage at single point of failure, (2) system entering or returning from overload at single point of failure, (3) switch configuration change during software generic build, (4) denial of service attack on single point of failure, among others. At step 328, the BOF subsystem 204 logs the event in the Audit Log 210.

Figure 3B:
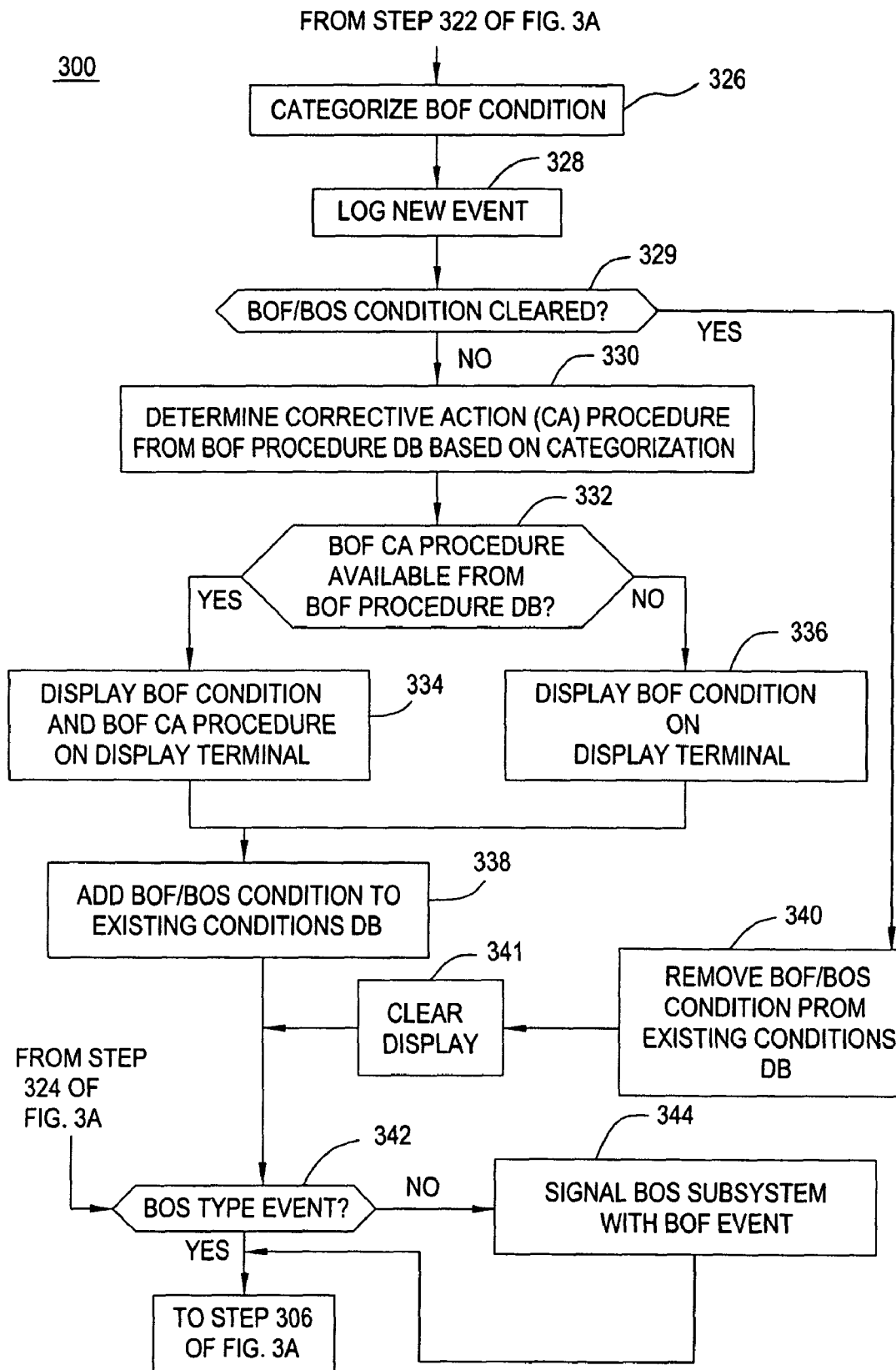

Referring to FIG. 3B, at step 329, the BOF subsystem checks if an existing BOF or BOS condition has been cleared. If at step 329, the existing BOF or BOS condition has been cleared, the method 300 proceeds to step 340. At step 340, the BOF subsystem 204 removes the cleared BOF or BOS condition from the Existing Conditions Database 218, notifies the Display Subsystem 206 to clear the BOF or BOS condition from the display at step 341, and proceeds to step 342, as discussed below. If at step 329 an existing BOF condition has not been cleared, the method 300 proceeds to step 330.

At step 330, the BOF subsystem 204 uses the classification of the new event to look up a procedure to address the BOF condition from the BOF Procedures database 212. The BOF Procedures database 212 contains network reliability best practices populated from various best practices databases, such as those available from the Network Reliability and Interoperability Council (NRIC), among others. If at step 332, the database 212 contains a procedure to address the BOF condition, the appropriate procedure is returned to the BOF Subsystem 204. At step 334, the BOF Subsystem 204 then sends a notification of the BOF condition, as well as any BOF procedure returned from the BOF procedures database 212 to the Display Subsystem 206 for presentation to network operations personnel.

If at step 332, there aren't any BOF procedures available in the BOF procedures database 212, at step 336, the BOF Subsystem 204 still sends a notification of the BOF condition to the Display Subsystem 206. The BOF Subsystem 204 proceeds to step 338 and records the current BOF or BOS condition in the Existing Conditions database 218. The BOF Subsystem 204 then proceeds to step 342.

At step 342, the BOF Subsystem 204 checks if the event is a BOS type event 342, and if so, the method proceeds to step 306 (FIG. 3A). If at step 342, the event is not a BOS type event, the BOF Subsystem 204 proceeds to step 344 where the BOF Subsystem 204 signals the BOS Subsystem 202 with a BOF event 240. The BOF Subsystem then proceeds to step 306 (FIG. 3A), where the BOF Subsystem 204 continues to monitor for a new event.

Figure 3C:
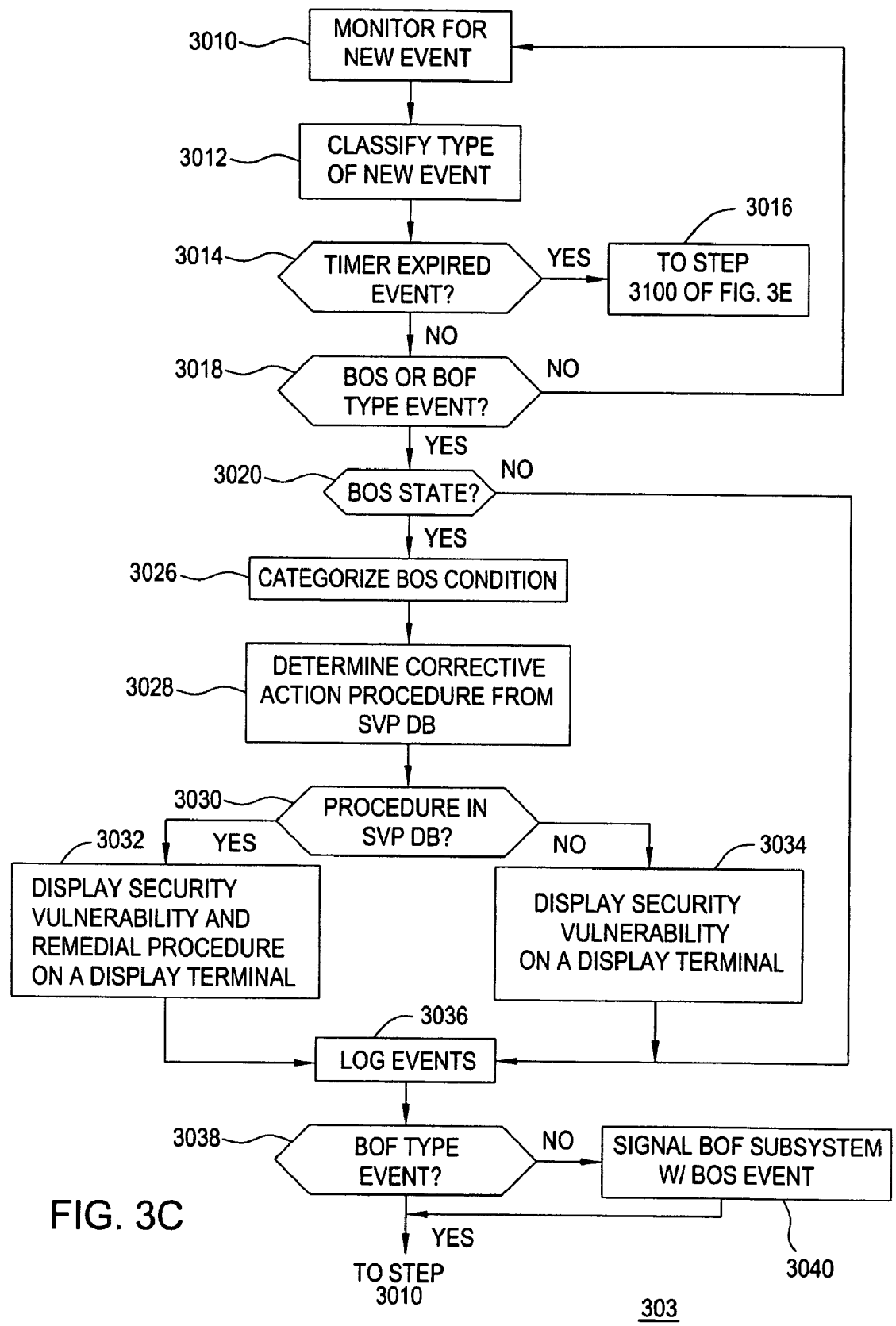
Figure 3D:
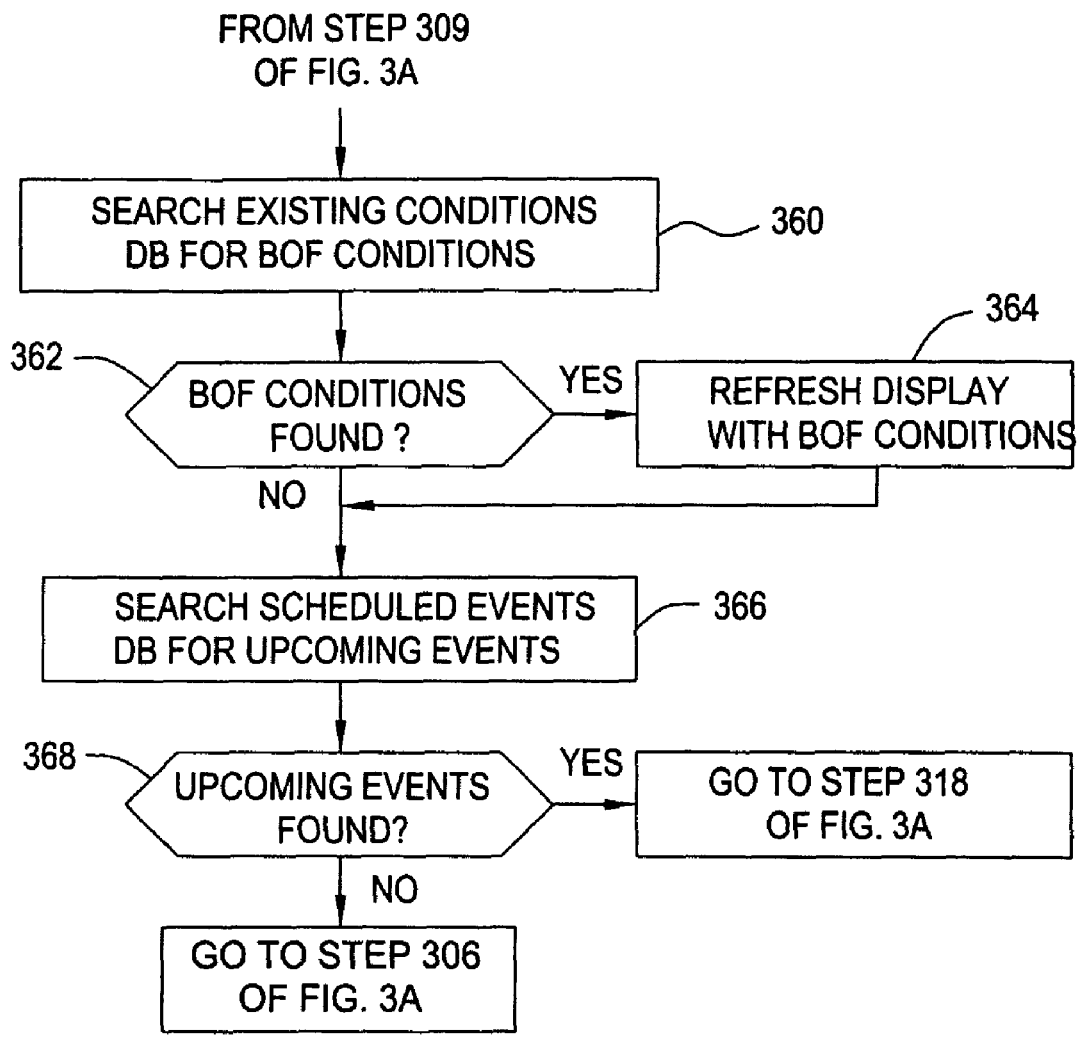

As mentioned above, the BOF Subsystem 204 proceeds to step 360 (FIG. 3D) in an instance where at step 309 (FIG. 3A), a system timer expiration event has been detected. Referring to FIG. 3D, at step 360 the BOF Subsystem 204 searches the Existing Conditions Database 218 for previously recorded BOF conditions and proceeds to step 362. At step 362, if any BOF conditions were found, the BOF Subsystem proceeds to step 364 where the Display Subsystem 206 is refreshed with the newly found BOF conditions. The BOF Subsystem 204 then proceeds to step 366. If at step 362 no BOF conditions were found, the BOF Subsystem then proceeds directly to step 366.

At step 366, the BOF Subsystem 204 searches the Scheduled Events Database 216 for upcoming planned events such as maintenance activities, software loads, power outages, among others, and then proceeds to step 368. If at step 368 an upcoming event has been found, the BOF Subsystem 204 proceeds to step 318 (FIG. 3A); otherwise, the BOF Subsystem 204 proceeds to step 306 (FIG. 3A).

The BOF Subsystem 204 correlates upcoming, planned maintenance activities that are recorded in the Scheduled Events Database 216 with a newly created single point of failure in the network that is reflected in the new network topology (stored in the Network Topology Database 220) to determine if the network is in a BOF condition. Conventional and adapted event correlation tools may be utilized such as the work by Kettschau et al in a publication entitled "LUCAS—an Expert System for Intelligent Fault Management and Alarm Correlation," Proc. $8^{th}$ IEEE/IFIP Network Operations and Management Symposium (NOMS) (Florence, Italy, 2002), pp. 903-905, which is incorporated by reference herein in its entirety. In particular, the article discusses an event correlation tool for wireless GSM networks that filters and interprets alarms to simplify the network operator decision-making process thereby shortening their reaction time. Other exemplary correlation tools are discussed with regard to the publication of Zheng et al. in an article entitled "Intelligent Search of correlated Alarms from Database Containing Noise Data," Proc.$8_{th}$ IEEE/IFIP Network Operations and Management Symposium (NOMS) (Florence, Italy, 2002), pp. 405-419, which is incorporated by reference herein in its entirety. In particular, Zheng et al describes a data-mining algorithm to discover alarm correlation rules in the presence of noisy data.

If the BOF Subsystem 204 finds a scheduled event that could cause a network outage, the BOF Subsystem 204 sends a message to the Display Subsystem 206 describing the scheduled event, as well as detailing the fact that it will cause a network outage. The BOF Subsystem 206 also records this information in the Existing Conditions Database 218.

A network event may also transition the network out of a BOF or BOS condition. If, after processing the network event, the BOF Subsystem 204 detects that the network has transitioned out of a BOF or BOS condition, the condition is removed from the Existing Conditions database 218 and a message indicating the clearing of the BOF condition is sent to the Display Subsystem 206. The BOF Subsystem 204 also periodically polls the Existing Conditions Database 218 for BOF conditions that have not been addressed, and sends a message to the Display Subsystem 206 for each entry that has not been addressed. These messages are displayed to remind network operators that various BOF conditions still exist.

Figure 3E:
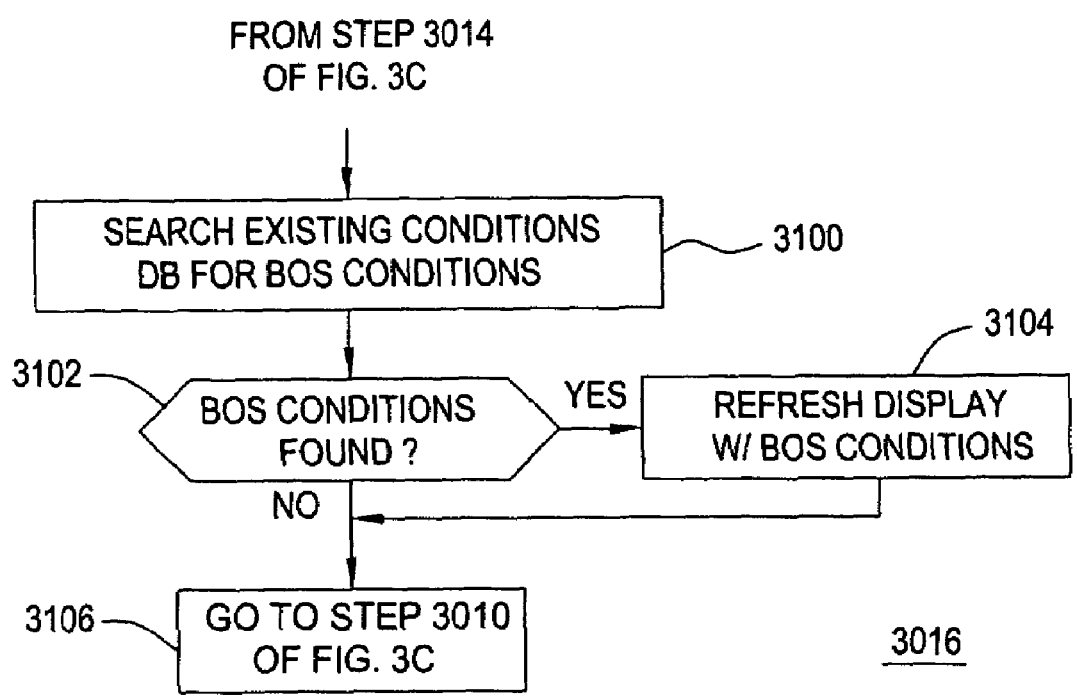

After the BOF condition (and corrective action procedures) has been classified, and logged, at step 329 (FIG. 3B) the BOF subsystem determines whether the BOF or BOS condition has been resolved. If the BOF or BOS condition has not been resolved, it remains in the Existing Conditions Database 218, and the method 300 continues to display the BOF or BOS condition at either step 364 (FIG. 3D) or step 3104 (FIG. 3E). If at step 329, the BOF or BOS condition has been resolved (rectified), the method 300 proceeds to step 340, where the condition is removed from the Existing Conditions Database 218. The BOF subsystem 204 then proceeds to step 341, where the Display Subsystem 206 updates the display to indicate the clearing of the BOF or BOS condition.

Once the BOS Subsystem 202 process has been spawned at step 303 (FIG. 3A), the BOS Subsystem 202 proceeds to step 3010 (FIG. 3C) where it waits for a new event. When a new event arrives, the BOS Subsystem 202 proceeds to step 3012, where the new event is classified as a system timer expiration type event or a potential BOS/BOF type event. At step 3014, the BOS Subsystem 202 determines if the new event is a timer expiration type event, and if so, the method 300 proceeds to step 3100, as discussed below in further detail with respect to FIG. 3E. Otherwise, the BOS Subsystem 202 proceeds to step 3018, where the BOS Subsystem 202 determines if the new event is a BOS type or BOF type of event. If the event type is neither BOF type nor BOS type of event, the BOS Subsystem 202 proceeds to step 3010.

At step 3018, if the event type is either a BOF type or a BOS type of event, the BOS Subsystem 202 proceeds to step 3020, where the BOS Subsystem 202 determines if the network is in a BOS state. The types of considerations that are used to determine if the network is in a BOS state include: (1) denial of service attack event, (2) system restart type of event, (3) intrusion detection event, among others. If at step 3020, the network is not in a BOS state, the method 300 proceeds to step 3036, where the event is logged in the Audit Log 210. If at step 3020, the network is in a BOS state, the BOS method 300 proceeds to step 3026, where the BOS condition is classified based on the type of event received, in order to assist in locating the associated corrective action procedure in the Security Vulnerabilities & Procedures Database 214. The BOS condition classifications include: (1) denial of service attack, (2) system restart with default admin password, (3) network intrusion, among others.

At step 3028 the BOS Subsystem 202 uses the BOS condition classification to look up a procedure to address the BOS condition from the Security Vulnerabilities and Procedures Database 214. If at step 3030 the database 214 contains a procedure to address the BOS condition, the appropriate procedure is returned to the BOS Subsystem 202. At step 3032 the BOS Subsystem 202 then sends a notification of the BOS condition, as well as any procedure returned from the Security Vulnerabilities and Procedures Database 214 to the Display Subsystem 206 for presentation to network operations personnel and proceeds to step 3036.

If at step 3030 there aren't any BOS procedures available from the Security Vulnerabilities and Procedures Database 214, then at step 3034 the BOS Subsystem 202 still sends a notification of the BOS condition to the Display Subsystem 206. The method then proceeds to step 3036.

At step 3036, the BOS Subsystem 202 logs the BOS condition in the Audit Log 210 for future reference, and proceeds to step 3038. At step 3038, the BOS Subsystem 202 determines if the new event is a BOF type of event. If the new event is not a BOF type of event 240 the BOS Subsystem 202 proceeds to step 3040, where it signals the BOF Subsystem 204 with a BOS type event 242. The BOS Subsystem 202 then proceeds to step 3010. If at step 3038 the BOS Subsystem 202 determines that the new event type is a BOF type event 240, the method 300 proceeds directly to step 3010.

Recall that the BOS Subsystem 202 proceeds to step 3100 (FIG. 3E) if at step 3014 (FIG. 3C) a determination is made that a timer expiration type event occurred. Referring to FIG. 3E, at step 3100, the BOS Subsystem 202 searches the Existing Conditions Database 218 for BOS conditions. The Existing Conditions Database 218 returns any BOS conditions to the BOS Subsystem 202 at step 3102. If any BOS conditions are returned, the BOS Subsystem proceeds to step 3104 where the Display Subsystem 206 is notified to refresh the display of the BOS condition. The BOS Subsystem then proceeds to step 3010 (FIG. 3C). If no BOS conditions are found at step 3102, the BOS Subsystem proceeds directly to step 3010 (FIG. 3C).

It is noted that a Security Management System 232 notifies the BOS Subsystem 202 of a new network security event. The Breach of Security (BOS) Subsystem 202 is responsible for determining if a network event has introduced any potential security vulnerabilities into the network 100. If the BOS subsystem 202 determines that the new event has caused the network 100 to enter into a BOS state, then at step 3026 (FIG. 3C) the BOS Subsystem 202 classifies the BOS condition, such as a denial of service attack, network intrusion, system restart with default administrator password, and the like. The method 300 then proceeds to step 3028. The BOS Subsystem classifies the BOS condition because the procedures used to address BOS situation are organized by BOS condition classification in the Security Vulnerabilities and Procedures Database 214.

At step 3028, the BOS subsystem 202 searches the Security Vulnerabilities and Procedures Database 214 for an entry corresponding to this type of BOS condition. The Security Vulnerabilities and Procedures Database 214 contains known security vulnerabilities and procedures to address them and is populated from various security vulnerability databases, such as those available from CERT, National Institute of Science and Technology (NIST), among other organizations. If at step 3030 a security vulnerability procedure is found, then at step 3032 a message containing the security vulnerability and any associated remedial procedures is sent to the Display Subsystem 206 for presentation, illustratively, on a terminal. At step 3036, the BOS Subsystem 202 also records this information in the Audit Log 210.

If at step 3030 a security vulnerability procedure is not found, then at step 3034 a message containing just the security vulnerability is sent to the Display Subsystem 206 for presentation on the terminal. At step 3036, the BOS Subsystem 202 also records this information in the Audit Log 210.

A network event may also transition the network out of a BOS condition. If a network event indicates the network is returning to a normal condition (e.g., buffers returning below threshold, operator action to address the vulnerability, etc.), the BOF Subsystem 204 will scan the Existing Conditions Database 218 for BOS conditions that are cleared by the network event. The BOF Subsystem 204 removes any matching BOS conditions from the Existing Conditions Database 218 and sends a message indicating the clearing of the BOS condition to the Display Subsystem 206.

The BOS Subsystem 202 also periodically polls the Existing Conditions Database 218 for BOS conditions that have not been addressed and sends a message to the Display Subsystem 206 for each entry it finds. This message is displayed to remind network operators that the BOS condition still exists.

Once the event is recorded in the Audit Log at step 3036, the method 300 proceeds to step 3038 where it decides if a triggering signal needs to be sent to the BOF subsystem 204. In particular, any new breach of security condition will initiate a new event that is handled by the BOF Subsystem 204 of the present invention. Upon receiving the triggering signal, the BOF subsystem 204 initiates method 300 beginning at step 304 of FIG. 3A. The method 300 then proceeds as discussed above for each new event, whether such new event is a new brink of failure type of condition, breach of security type of condition, or corrective action to rectify either the BOF or BOS type conditions.

The teachings of method 300 may be illustrated by a sequence of events occurring on the exemplary network 100 of FIG. 1. FIGS. 1, 2, and 3A-3E should be viewed together. Referring to FIG. 1, assume Load Balancer 1 132$_{11}$, of Company A 104$_1$, comprises three two-port line cards (not shown). The two ports of a first line card are respectively connected to firewalls 1 and 2 118$_{11}$ and 118$_{12}$, the two ports of a second line card are respectively connected to firewall 3 118$_{1p}$ (where in this example, p=3) and a first cache server 129$_{11}$, and the two ports of a third line card are respectively connected to a second cache server 120$_{12}$ and a third cache server 120$_{1r}$ (where in this example, r=3). Further assume that the first line card goes offline, and that the two ports connected to Firewalls 1 and 2 118$_{11}$, and 118$_{12}$ can no longer communicate. The network 100 has now entered a single point of failure condition because if the path through Firewall 3 118$_{1p}$ goes down, all access to Company A's web servers is lost.

The BOF Subsystem 204 receives a message from the Network Management System 230 indicating that the first line card has gone offline, and updates its Network Topology Database 220 to deactivate the links between Load Balancer 1 132$_{11}$ and Firewalls 1 and 2 118$_{11}$, and 118$_{12}$. The updated network topology reveals that the network 100 has entered a single point of failure condition. The BOF Subsystem 204 searches the Scheduled Events Database 216 for any activities that are planned for Load Balancer 1 132$_{11}$ or Firewall 3 118$_{1p}$. If any relevant activities are found (e.g., if the Scheduled Events DB 216 indicates that new software is scheduled to be loaded into Firewall 3 118$_{13}$), then the network is in a BOF state, and an appropriate message is sent to the Display Subsystem 206. Finally, the Existing Conditions Database 218 is updated to include this new BOF Condition. This network event does not affect the network security posture so no BOS processing by the BOS subsystem 202 is required.

Further assume that losing the paths through Firewalls 1 and 2 118$_{11}$ and 118$_{12}$ causes all traffic destined for Company A's web servers 134 to go through Firewall 3 118$_{1p}$. This increase in traffic may exceed the capacity of Firewall 3's 118$_{1p}$'s packet classification engine. This could result in packets bypassing the classification engine and being admitted to the DMZ 130 without being examined by the firewall 3 118$_{1p}$, which represents an obvious security vulnerability to Company A's web servers 134. If Firewall 3 118$_{1p}$ sends a message to the Network Management System 230 when the packet classification engine load is approaching its threshold, the message will be forwarded to the BOF/BOS System 160. The BOS Subsystem 202 will find the appropriate security vulnerability and remedial procedure in the Security Vulnerabilities and Procedures Database 214 and forward the BOS condition notification, which includes the security vulnerability and remedial procedure, to the Display Subsystem 206 to be displayed to network operations personnel. The Existing Conditions Database 218 is updated to include this new BOS condition.

When network operations personnel take the appropriate actions to remedy the security vulnerability (e.g., reducing the port speed on Load Balancer 1 1201$_{11}$, thereby reducing the amount of traffic received by Firewall 3 118$_{1p}$), Firewall 3 118$_{1p}$ will send a message to the Network Management System 230 indicating that the packet classification engine load has returned to normal. The BOF Subsystem 204 will receive this message from the Network Management System 230, clear this BOS condition from the Existing Conditions Database 218, and send a message to the Display Subsystem 206 indicating that the BOS condition no longer exists. Likewise, when the BOF Subsystem 204 is notified that the line card for Load Balancer 1 120$_{11}$, is back online, the BOF Subsystem 204 clears the single point of failure condition from the Existing Conditions Database 218.

Further understanding of the present invention is presented through a second example, as discussed with respect to FIGS. 2, 4A-4D, and 5A-5D, which should be viewed together. The example shown by FIGS. 4A-4D and 5A-5D illustrates how the BOF/BOS DRS 160 of the present invention can aid detection and recovery of brink of failure and breach of security conditions. For the sake of brevity, the scenario and network described are purposely kept simple, however the reader will readily see how the concepts illustrated here can be applied to a real scenario occurring on a real network.

Figures 4D, 5D:

FIGS. 4A-4D depict an exemplary network 400 utilizing the BOF/BOS DRS 160 of the present invention, and FIGS. 5A-5D depict exemplary display screens 500 of the BOF/BOS DRS 160 respectively associated with the exemplary network 400 of FIGS. 4A-4D. In particular, FIG. 4A shows an exemplary data network 400 across the United States where normal traffic between Seattle (switch S2) and Chicago (S6) flows through a switch (S1) in Denver. If the Denver node (S1) were to go down, today's networks automatically self-heal by finding another route for the Seattle-Denver traffic and rerouting the traffic illustratively through Dallas, as depicted in FIG. 4B. However, the Denver node going down has also introduced security vulnerabilities into the network, for example, open logical and physical connections at the connecting nodes (Seattle (S2), Chicago (S6) and Dallas (S5)), which are not automatically addressed (e.g., disconnected) with today's technology.

The Breach of Security detection technology of the present invention recognizes that the network 400 has a security vulnerability, pinpoints the location of the security vulnerability, and displays this information along with the corrective actions to be performed on a Network Operations Center (NOC) console, as depicted in FIG. 5A, in order to close the security vulnerability. The NOC console of FIG. 5A displays the existence of a Breach of Security in the network, as well as procedures to be performed in order to secure the network. The first line of the notification indicates where the Breach of Security is and what it is (e.g., BOS_S1). In this example, the Breach of Security is located in switch S1 and is caused by the Denver switch (S1) going offline. The remaining lines in the notification identify the Breach of Security procedure to be performed, in this instance procedure P1, and list the actions that make up the procedure. The Breach of Security notification is illustratively displayed as red text on the NOC screen as long as the Breach of Security condition has not been addressed. Once the network operations personnel have secured the security breach, the color of the text automatically changes, illustratively to green, to indicate that the BOS condition has been cleared. The Breach of Security indication, corrective actions performed, and the clearing of the Breach of Security are saved in the Audit Log 210 for auditing and reporting purposes.

Continuing with the example, the extra traffic has illustratively caused the node in Dallas (S5) to approach overload condition, indicated by the large circle in FIG. 4C. If the Dallas node were to stop forwarding traffic, connectivity would be lost between the eastern and western portions of the network 400. This type of situation is a Brink of Failure condition because, from a reliability aspect, all of the data traffic is now routed through the Dallas node (S5) without any redundant paths. Keep in mind that even though handling these types of situations is routine in today's networks, it is being presented as a simplified example.

The brink of failure detection technology of the present invention recognizes that the network 400 has entered into a Brink of Failure condition, pinpoints the location of the Brink of Failure, and displays this information along with the corrective actions to be performed in order to resolve the Brink of Failure on a NOC display depicted in FIG. 5B. It is noted that the previous Breach of Security entry is now green, indicating that the condition has been resolved and that the Brink of Failure indication is illustratively displayed in yellow. In one embodiment, if the Brink of Failure condition becomes worse, or is not resolved in an appropriate amount of time, its indication would turn red and start blinking.

In FIG. 5B, the first line of the Brink of Failure notification (BOF_S5) indicates where the Brink of Failure is and what it is. In this example, the Brink of Failure is located in switch S5 (Dallas node) and is caused by the switch approaching a traffic overload condition. The remaining lines in the notification identify the Brink of Failure procedure to be performed, in this instance procedure P1, and list the actions that make up the procedure. Once the network operations personnel have taken corrective action, the color of the text automatically changes (e.g., to green) to indicate that the BOF condition has been cleared. The Brink of Failure indication, the corrective actions performed, and the clearing of the Brink of Failure are saved in the Audit Log 210 for auditing and reporting purposes.

Now assume that an imminent maintenance activity to be performed on the Dallas node (S5) was scheduled months in advance and requires shutting off power. One realizes that it is not prudent to perform this maintenance activity while the Denver node (S1) is still down. The Brink of Failure detection system 160 recognizes this as a brink of failure condition and displays a message on the NOC screen as shown in FIG. 5C.

Note that in FIG. 5C, the previous two incidents have been cleared, which is indicated by green text on the screen. The new Brink of Failure indication shows that Dallas switch S5 has re-entered a Brink of Failure condition, this time due to an impending, scheduled power outage. Brink of Failure Procedure P2 informs the network operator of the tasks to perform; namely, reschedule the maintenance and verify that the power back-up is working in case it's too late for the maintenance to be rescheduled. If these procedures are not completed in the appropriate timeframe, in one embodiment, the color of the Brink of Failure indication turns from yellow to red and starts blinking. Once these activities have been performed, the indication turns green. As before, the Brink of Failure indication, the corrective actions performed, and the clearing of the Brink of Failure are saved in the Audit Log file on disk 210 for auditing and reporting purposes.

Finally, assume that the additional traffic has caused the packet classification buffers in the Dallas node (S5) to exceed their thresholds. Packet classification engines have been known to crash if there is too much traffic. If the packet classification engine crashes, every type of packet would be allowed into the network. Therefore, packet classification buffer overflows represent a potential security breach. The BOF/BOS System 160 recognizes this condition and displays a Breach of Security indication on the NOC console as depicted in FIGS. 4D and 5D. The BOS subsystem 202 then handles the BOS condition in a similar manner as discussed above.

The BOF/BOS System 160 of the present invention prevents predictable network outages caused by macro events, and can mitigate events that could lead to outages by alerting network operations personnel to BOF and BOS conditions in time to take corrective action. The BOF/BOS System 160 can also prioritize events that could lead to an outage and provide the projected time window of when the network outage will occur. In addition, the system can provide insights that can help to better coordinate planned network activities. The system also proactively displays BOF/BOS procedures that can minimize the business impact to the Service Provider.

Network outages cost Service Providers money in several ways, the most obvious being the direct loss of revenue from customers being unable to access the network during the outage resulting in dissatisfied customers. In addition, with today's trend of offering Service Level Agreements (SLAs) to customers, Service Providers incur significant additional penalties in the form of free service or punitive damages should their networks become unavailable. Regulators in many countries, including the United States, currently require a detailed report if voice networks experience prolonged outages and also assess penalties for critical network outages. These types of requirements are on the horizon for data networks and represent a significant risk because of the historically low reliability of data networks as compared to voice networks. By identifying and reporting network Brink of Failure and Breach of Security conditions, the BOF/BOS System 160 presents a window of opportunity to the Service Provider for avoiding an outage or mitigating the impact of an outage. The network operator now has time to take a proactive role in avoiding the network outage and to perform preventive actions to avoid imminent network outages and their associated loss of revenue.

The BOF/BOS System 160 automatically and continuously monitors the network for Brink of Failure and Breach of Security conditions and reports them along with remedial actions to network operations personnel. Today, monitoring a network for these types of conditions is a labor-intensive process and BOF/BOS conditions can go unnoticed even with the most advanced network management systems 230. In addition, network monitoring can never be 100% effective in preventing network outages because a series of seemingly unrelated and minor events over an extended period of time, or in seemingly uncorrelated locations in the network, can escalate to catastrophic network failure as well as dynamically alter the network's security posture. The interactions between these events are too subtle and occur over a time period that is too long for people to recognize the correlation and impending situation. The BOF/BOS System 160 helps minimize the number of tasks that must be performed by network operations personnel, thereby potentially reducing the overall cost of network operations.

What is claimed is:

1. A method for managing a network, comprising the steps of:
   detecting occurrence of a network event, said network event having associated with it a network condition comprising at least one of an unplanned macro-event and a planned macro-event related to at least one of a network element and a communication link of said network;
   classifying said network event as being at least one of a network element failure, a communications link failure, and a security breach; and
   identifying said network event as a network degradation event in response to at least one network event exceeding a network degradation threshold, wherein said network degradation event is defined as at least one of a brink of failure (BOF) event and a breach of security (BOS) event, wherein if said network degradation event is defined as a BOF event a determination is made as to whether said BOF event also causes a BOS event, wherein if said network degradation event is defined as a BOS event a determination is made as to whether said BOS event also causes a BOF event.

2. The method of claim 1, further comprising the step of: sending an alert to normalize said network degradation event.

3. The method of claim 1, wherein said network event is associated with at least one of a network management system, a security management system, and a system timer.

4. The method of claim 1, wherein said step of identifying comprises the step of:
   defining said network degradation event as a brink of failure (BOF) event in an instance where said network event is at least one of a type determined to cause a failure of at least one network element within a predetermined time interval and a type determined to cause a failure of at least one communication link within a predetermined time interval.

5. The method of claim 4, wherein said step of identifying further comprises the step of:
   defining said network degradation event as a breach-of-security (BOS) event in an instance where said network event exploits a security vulnerability resulting in at least one of an unauthorized access, an unauthorized modification or compromise, a denial of access to information, a denial of access to network monitoring capability, and a denial of access to network control capability.

6. The method of claim 5, further comprising the steps of: reporting at least one of said BOF event and BOS event.

7. The method of claim 6 further comprising the steps of: categorizing said BOF event;
   determining at least one corrective action procedure associated with said BOF event; and
   reporting at least one of a network element and a communications link associated with said BOF event, and said at least one corrective action procedure.

8. The method of claim 7, wherein said step of determining at least one corrective action procedure comprises the step of assessing a BOF database comprising historical information associated with global network reliability practices.

9. The method of claim 6, wherein in an instance where said network degradation event is associated with a BOS event, said method further comprises the steps of:
   categorizing said BOS event;
   determining at least one corrective action procedure associated with said
   BOS event; and
   displaying at least one of a network element and a communications link associated with said BOS event, and said at least one corrective action procedure.

10. The method of claim 9, wherein said step of determining at least one corrective action procedure comprises the step of assessing a Security Vulnerabilities and Procedures database comprising at least one of historical information of said network and associated global security vulnerabilities and procedures.

11. The method of claim 6 further comprising the steps of:
    initiating a new network event upon resolving said network degradation event;
    removing said network degradation event from said existing conditions database; and
    reporting said network degradation event as a resolved event.

12. The method of claim 11, wherein resolving said network degradation event further comprises at least one of:
    resolving said BOF event, such that the BOF event and a BOS condition are cleared; and
    resolving said BOS event, such that the BOS event and a BOF condition are cleared.

13. The method of claim 4, wherein said step of defining said network degradation event as a brink-of-failure (BOF) event further comprises the step of:

correlating network events stored in an existing conditions database with information stored in said a network topology database and events stored in a scheduled events database.

14. The method of claim 1, wherein said step of identifying said network degradation event comprises the step of:
assessing at least one of failure rates, mean-time-between-failures (MTBF), mean-time-to-repair (MTTR), and spare parts availability for at least one of network elements and communication links associated with said network event.

15. The method of claim 1, wherein in response to the step of classifying said network event, said method further comprises the steps of:
updating an existing conditions database with indicia of said network event;
determining a latest network topology associated with said network event; and
updating a network topology database with said latest network topology.

16. The method of claim 1, wherein said step of identifying a network event comprises the step of identifying events associated with at least one of end-user data traffic, in-band control traffic, out-of-band control traffic, in-band network management traffic, and out-of-band network management traffic.

17. A method for managing a network, comprising the steps of:
detecting occurrence of a network event, said network event having associated with it a network condition comprising at least one of an unplanned macro-event and a planned macro-event related to at least one of a network element and a communication link of said network;
classifying said network event as being at least one of a network element failure, a communications link failure, and a security breach;
identifying said network event as a network degradation event in response to at least one network event exceeding a network degradation threshold by defining said network degradation event as a brink of failure (BOF) event in an instance where said network event is at least one of a type determined to cause a failure of at least one network element within a predetermined time interval and a type determined to cause a failure of at least one communication link within a predetermined time interval;
determining whether said BOF event also causes a BOS event; and
sending an alert to normalize said network degradation event.

18. The method of claim 17, wherein said step of identifying further comprises the step of:
defining said network degradation event as a breach-of-security (BOS) event in an instance where said network event exploits a security vulnerability resulting in at least one of an unauthorized access, an unauthorized modification or compromise, a denial of access to information, a denial of access to network monitoring capability, and a denial of access to network control capability.

19. The method of claim 18, wherein in response to the step of classifying said network event, said method further comprises the steps of:
updating an existing conditions database with indicia of said network event;
determining a latest network topology associated with said network event; and
updating a network topology database with said latest network topology.

20. The method of claim 18, further comprising the steps of:
determining whether said BOS event also causes a BOF event; and
reporting at least one of said BOF event and BOS event.

21. The method of claim 20 further comprising the steps of:
categorizing said BOF event;
determining at least one corrective action procedure associated with said BOF event; and
reporting at least one of a network element and a communications link associated with said BOF event, and said at least one corrective action procedure.

22. The method of claim 20, wherein in an instance where said network degradation event is associated with a BOS event, said method further comprises the steps of:
categorizing said BOS event;
determining at least one corrective action procedure associated with said BOS event; and
displaying at least one of a network element and a communications link associated with said BOS event, and said at least one corrective action procedure.

23. The method of claim 20, further comprising the steps of:
initiating a new network event upon resolving said network degradation event;
removing said network degradation event from said existing conditions database; and
reporting said network degradation event as a resolved event.

24. Apparatus for managing a network, comprising:
means for detecting occurrence of a network event, said network event having associated with it a network condition comprising at least one of an unplanned macro-event and a planned macro-event related to at least one of a network element and a communication link of said network;
means for classifying said network event as being at least one of a network element failure, a communications link failure, and a security breach;
means for identifying said network event as a network degradation event in response to at least one network event exceeding a network degradation threshold, wherein said network degradation event is defined as at least one of a brink of failure (BOF) event and a breach of security (BOS) event;
means for determining whether a network degradation event defined as a BOF event also causes a BOS event; and
means for determining whether a network degradation event defined as a BOS event also causes a BOF event.

25. The apparatus of claim 24, further comprising:
means for sending an alert to normalize said network degradation event.

26. The apparatus of claim 24, wherein said means for identifying comprises:
means for defining said network degradation event as a brink of failure (BOF) event in an instance where said network event is at least one of a type determined to cause a failure of at least one network element within a predetermined time interval and a type determined to cause a failure of at least one communication link within a predetermined time interval.

27. The apparatus of claim 26, wherein said means for identifying further comprises:
means for defining said network degradation event as a breach-of-security (BOS) event in an instance where said network event exploits a security vulnerability resulting in at least one of an unauthorized access, an unauthorized modification or compromise, a denial of access to information, a denial of access to network monitoring capability, and a denial of access to network control capability.

28. The apparatus of claim 27, further comprising:
means for reporting at least one of said BOF event and BOS event.

29. The apparatus of claim 28 further comprising:
means for categorizing said BOF event;
means for determining at least one corrective action procedure associated with said BOF event; and
means for reporting at least one of a network element and a communications link associated with said BOF event, and said at least one corrective action procedure.

30. The apparatus of claim 28, wherein said apparatus further comprises:
means for categorizing, in an instance where said network degradation event is associated with a BOS event, said BOS event;
means for determining at least one corrective action procedure associated with said BOS event; and
means for displaying at least one of a network element and a communications link associated with said BOS event, and said at least one corrective action procedure.

31. The apparatus of claim 28 further comprising:
means for initiating a new network event upon resolving said network degradation event;
means for removing said network degradation event from said existing conditions database; and
means for reporting said network degradation event as a resolved event.

32. The apparatus of claim 31, wherein resolving said network degradation event further comprises at least one of:
means for resolving said BOF event, such that the BOF event and a BOS condition are cleared; and
means for resolving said BOS event, such that the BOS event and a BOF condition are cleared.

33. The apparatus of claim 24, wherein said means for classifying further comprises:
means for updating an existing conditions database with indicia of said network event;
means for determining a latest network topology associated with said network event; and
means for updating a network topology database with said latest network topology.

34. A network management system for characterizing at least one network degradation event in a communications network, comprising:
a processing unit having access to at least one storage device;
at least a portion of said at least one storage device having a program product configured to:
detect occurrence of a network event, said network event having associated with it a network condition comprising at least one of an unplanned macro-event and a planned macro-event related to at least one of a network element and a communication link of said network;
classify said network event as being at least one of a network element failure, a communications link failure, and a security breach; and
identify said network event as a network degradation event in response to at least one network event exceeding a network degradation threshold, wherein said network degradation event is defined as at least one of a brink of failure (BOF) event and a breach of security (BOS) event, wherein if said network degradation event is defined as a BOF event a determination is made as to whether said BOF event also causes a BOS event, wherein if said network degradation event is defined as a BOS event a determination is made as to whether said BOS event also causes a BOF event.

* * * * *